United States Patent [19]

Snelling

[11] 4,403,848

[45] Sep. 13, 1983

[54] ELECTRONIC COLOR PRINTING SYSTEM

[75] Inventor: Christopher Snelling, Penfield, N.Y.

[73] Assignee: Xerox Corporation, Stamford, Conn.

[21] Appl. No.: 349,216

[22] Filed: Feb. 17, 1982

[51] Int. Cl.³ .................. G03G 15/00; G03G 15/01
[52] U.S. Cl. ................................ 355/4; 355/14 R;
355/1; 355/3 R
[58] Field of Search ............. 355/4, 14 R, 3 R, 3 CH,
355/14 E, 14 D, 14 CH, 8, 1; 118/645, 624;
324/72; 358/300; 250/226, 227; 96/1, 2, 1 E,
1.5, 1 LY; 430/58, 59

[56] References Cited

U.S. PATENT DOCUMENTS

| | | | |
|---|---|---|---|
| 3,438,705 | 4/1969 | King | 355/8 |
| 3,815,988 | 6/1974 | McVeigh et al. | 355/3 R |
| 3,953,206 | 4/1976 | Weigl | 96/1 LY |
| 3,976,372 | 8/1976 | Miyata et al. | 355/4 |
| 3,982,937 | 9/1976 | Wiedemann | 96/1.5 |
| 4,063,946 | 12/1977 | Tamai | 96/1.2 |
| 4,115,116 | 9/1978 | Stolka et al. | 96/1.5 R |
| 4,135,928 | 1/1979 | Hashimoto et al. | 96/1.5 R |
| 4,175,960 | 11/1979 | Berwick et al. | 430/58 |
| 4,189,224 | 2/1980 | Sakai | 355/4 |
| 4,230,405 | 10/1980 | Kurtz | 355/4 |
| 4,231,799 | 11/1980 | Rochlitz et al. | 430/59 |
| 4,234,250 | 11/1980 | Mailloux | 355/4 |
| 4,267,548 | 5/1981 | Kimura et al. | 355/3 RX |
| 4,319,830 | 3/1982 | Roach | 355/1 |
| 4,336,993 | 6/1982 | Banton | 355/1 X |
| 4,336,994 | 6/1982 | Banton | 355/3 RX |
| 4,348,100 | 9/1982 | Snelling | 355/14 R |
| 4,354,756 | 10/1982 | Arai et al. | 355/14 R X |
| 4,376,576 | 3/1983 | Snelling | 355/1 X |

Primary Examiner—A. C. Prescott
Attorney, Agent, or Firm—Frederick E. McMullen

[57] ABSTRACT

A multi-color printer using an additive color process to provide either partial or full color copies. Multiple scanning beams, each modulated in accordance with distinct color image signals, are scanned across the printer's photoreceptor at relatively widely separated points, there being buffer means provided to control timing of the different color image signals to assure registration of the color images with one another. Each color image is developed prior to scanning of the photoreceptor by the next succeeding beam. Following developing of the last color image, the composite color image is transferred to a copy sheet.

In an alternate embodiment, an input section for scanning color originals is provided. The color image signals output by the input section may then be used by the printing section to make full color copies of the original.

19 Claims, 8 Drawing Figures

ELECTRONIC COLOR PRINTING SYSTEM

The invention relates to electronic copying/printing systems and more particularly to an electronic multi-color copying/printing system.

In typical xerographic type color copiers, processing of the color copies is done in sequence. For example, in one well known commerical copier, a blue color separation image is first made, developed with yellow toner, and transferred to a copy sheet which is supported on a rotating drum synchronized to the copying process. Then, a second green color separation image is made, developed with magenta toner, and transferred to the copy sheet in superimposed registered relationship with the first color separation image. Lastly, a third red color separation image is made, developed with cyan toner, and transferred to the copy sheet in superimposed registered relationship with the previously transferred blue and green color separation images. The resulting combination of color separation images is thereafter fused to provide a permanent color copy.

As can be appreciated from the above discussion, the color copying process described is relatively slow, requiring approximately three times as much time to process one copy as is required to process a black and white copy. Additionally, great care must be taken to assure exact registration of the several color separation images with one another if a clear and exact copy of the color original is to be made.

The invention relates to a system for producing color copies comprising in combination, a movable photoreceptor; means to uniformly charge the photoreceptor in preparation for imaging; a beam of high intensity radiation impinging on the photoreceptor at a point downstream of the charging means; means for scanning the beam across the photoreceptor; modulating means to modulate the first beam in accordance with first color image signals as the beam is scanned across the photoreceptor whereby to selectively reduce the charge on the photoreceptor and create a first color latent electrostatic image on the photoreceptor; first color developing means for developing the first color image; at least one additional beam of high intensity radiation impinging on the photoreceptor at a point downstream of the first color developing means; means for scanning the additional beam across the photoreceptor; modulating means to modulate the additional beam in accordance with second color image signals as the additional beam is scanned across the photoreceptor whereby to selectively reduce the charge on the photoreceptor and create a second color latent electrostatic image on the photoreceptor; second color developing means for developing the second color image; and means for transferring the combined first and second color images to a copy substrate material.

The invention further relates to a method of producing color images, the steps which comprise; scanning a first writing beam modulated in accordance with first color image signals across a charged photoreceptor; developing areas discharged by the first beam with a first color toner to form a first color image on the photoreceptor; scanning at least a second writing beam modulated in accordance with second color image signals across the same area of the photoreceptor as scanned by the first beam; and developing areas discharged by the second beam with a second color toner to form a second color image on the photoreceptor in registered relation with the first color image.

IN THE DRAWINGS

DESCRIPTION OF THE FIG. 1 EMBODIMENT

Figure 1:
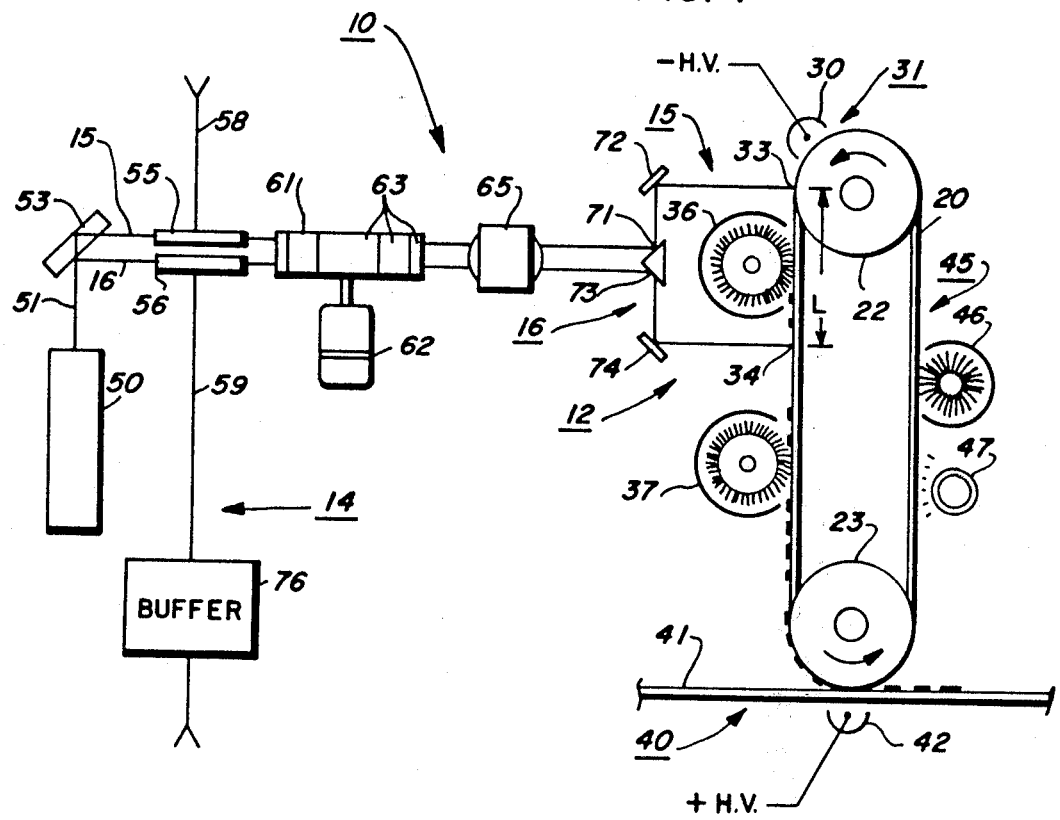
FIG. 1 is a schematic view showing details of the multi-color printer of the present invention.

Referring particularly to FIGS. 1 and 2 of the drawings, there is shown the multi-color printer 10 of the present invention. Printer 10 includes a xerographic processing section 12 and an image scanning or writing section 14, the latter serving to scan at least two high intensity imaging beams of electro-magnetic radiation 15, 16 across photoreceptor 20 of xerographic section 12 to provide at least a dual color image as will appear herein.

Xerographic processing section 12 includes a photoreceptor 20 illustrated herein in the form of an endless belt stretched across drive and idler belt support rollers 22, 23 respectively. Belt supporting rollers 22, 23 are rotatably mounted in predetermined fixed position by suitable means (not shown). Roller 23 is driven from a suitable drive motor (not shown) to move photoreceptor 20 in the direction shown by the solid line arrow. While photoreceptor 20 is illustrated in the form of an endless belt, other photoreceptor configurations such as a drum may be envisioned.

Figure 2A:
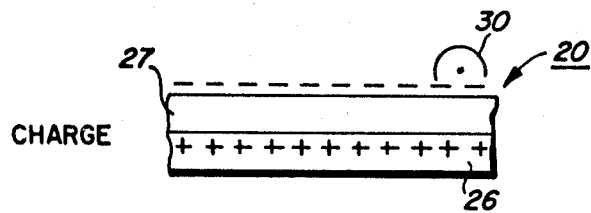
FIGS. 2a-2f are enlarged views of a photoreceptor section showing details of the additive color process employed by the multi-color printer of the present invention.
Figure 2B:
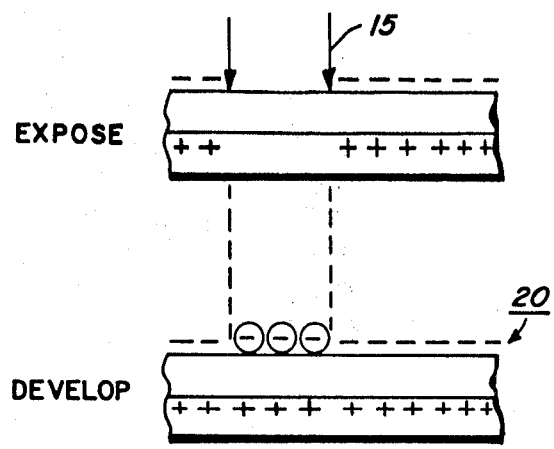
Figure 2C:
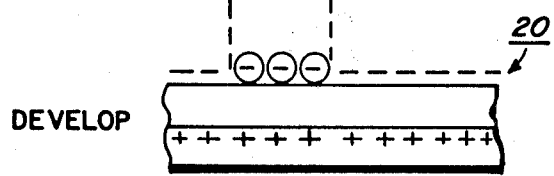

Referring particularly to FIG. 2a, photoreceptor 20 comprises an inner layer or substrate 26 composed of a suitable flexible electrically conductive substrate with an outer photoconductive layer 27 such as selenium thereupon. Photoreceptor 20 may be opaque, that is, impervious to electromagnetic radiation such as light, or wholly or partially transparent. The exemplary photoreceptor 20 typically has an aluminum substrate which renders the photoreceptor opaque. However, other substrate materials such as glass may be contemplated which would render photoreceptor 20 wholly or partially transparent. And photoreceptor materials other than selenium as for example organic may also be contemplated. One organic type material for example consists of an aluminized Myler substrate having a layer of selenium dispersed in poly-N-vinyl carbazole with a transparent polymer overcoating containing a charge transport compound such as pyrene.

Referring again particularly to FIG. 1, a corona charging device 30 commonly known as a corotron is operatively disposed adjacent photoreceptor 20 at charging station 31. Corotron 30 which is coupled to a suitable negative high voltage source (−Hv) serves to place a uniform negative charge on photoreceptor 20 in preparation for imaging.

Imaging beams 15, 16 impinge or contact photoreceptor 20 at exposure points 33, 34 respectively, the exposure point 34 of beam 16 being spaced a predetermined distance (L) downstream from the point 33 where beam 15 contacts photoreceptor 20. A pair of color developers 36, 37, exemplified herein by magnetic brush rolls, are disposed in operative contact with photoreceptor 20 downstream of the contact points 33, 34 of imaging beams 15, 16. Developers 36, 37 each include a suitable developer housing (not shown) within which a supply of color developing material is provided together with means for loading the color developing material onto the developer's magnetic brush roll.

As will be understood by those skilled in the xerographic arts, the color developing material normally consists of a suitable carrier material with relatively smaller color material (referred to as toner). Due to electrostatic forces, toner attached to the carrier is drawn to the latent electrostatic images formed on photoreceptor 20 by imaging beams 15, 16 in proportion to the image charge levels to develop the images. In the present arrangement, a discharge development system is used wherein, following negative charging of photoreceptor 20 by corotron 30, image areas are discharged by beams 15, 16 in accordance with image signals. The developing toner is negatively charged and is therefore attracted to the discharged image areas while being repelled from the un-discharged non-image areas.

It will be understood that the developing materials and particularly the toner is selected to provide the color image desired. For example, in the two developer arrangement disclosed in FIG. 1, developer 36 utilizes a red toner, while developer 37 utilizes a black toner. In that example, the developed image would be composed of red and black image areas in accordance with the particular colored image patterns generated by imaging beams 15, 16. Other color combinations may of course be envisioned. One type of toner found particularly suitable for use herein consists of toner materials that are transparent to electromagnetic radiation. As will appear, this type of toner permits subsequent imaging to be effected through previously developed toner images as when forming a second or third color separation image.

To eliminate or reduce contamination where one of the toners is lighter than the other, it is preferred that the lighter color developer be disposed upstream of the darker color developer. In the example alluded to above, red developer 36 would therefore preferably be disposed upstream of the black developer 37.

Following development of the latent electrostatic image created on photoreceptor 20 by colored developers 36, 37, the developed image is transferred to a suitable copy substrate material 41 such as paper at transfer station 40. To facilitate transfer, a transfer corotron 42 which is coupled to a high voltage power source (+Hv) is provided to attract the developed image on photoreceptor 20 to copy substrate material 41. Following transfer, the developed image is fixed as by a fuser (not shown). Any residual charges and/or developing material left on photoreceptor 20 are removed at cleaning station 45 by erase lamp 47 and cleaning brush 46 respectively.

Image scanning section 14 includes a suitable souce of high intensity electromagnetic radiation exemplified herein by laser 50. The beam of light 51 generated by laser 50 is separated into imaging beams 15, 16 by suitable means such as wedge mirror 53. The pair of beams reflected from mirror 53 pass through individual beam modulators 55, 56 which serve to modulate the intensity of the imaging beams 15, 16 in response to image signals input thereto through signal lines 58, 59. Modulators 55, 56 may comprise any suitable type of modulator such as a acousto optic type modulator. The image signals in lines 58, 59 may be derived from any suitable source such as an image input scanner, memory, communication channel, and the like.

From modulators 55, 56 the imaging beams 15, 16 strike a suitable scanning element shown here as rotating polygon 61. Polygon 61 is rotated by motor 62 in synchronism with movement of photoreceptor 20 and at a speed sufficient to scan imaging beams 15, 16 across photoreceptor 20 without noticeable distortion. A suitable lens 65 serves to focus the imaging beams 15, 16 reflected from the mirrored facets 63 of polygon 61 onto photoreceptor 20.

As described heretofore, imaging beams 15, 16 impinge on photoreceptor 20 at exposure points 33, 34 respectively which are spaced a predetermined distance L from one another along photoreceptor 20, the distance L being chosen to accommodate color developer 36. To provide the requisite spacing L between exposure points 33, 34, mirror pairs 71, 72 and 73, 74 are provided to re-route imaging beams 15, 16, mirrors 71, 73 serving to first turn beams 15, 16 in an outward direction substantially paralleling the path of movement of photoreceptor 20 with mirrors 72, 74 serving to restore beams 15, 16 to a direction which will intersect photoreceptor 20 at exposure points 33, 34 respectively. Mirrors 72, 74 as will be understood, are spaced apart by the distance L in the exemplary arrangement shown.

To accommodate the exposure delay due to spacing of the second imaging beam downstream of the first imaging beam and to assure registration of the second color image with the first color image, a suitable image signal delay device such as buffer 76 is provided in the image signal input line 59 to modulator 56. Buffer 76 is chosen to delay input of the image signals to modulator 56 by an interval sufficient to register the second color image with the first color image.

While imaging beams 15, 16 are illustrated as impinging on the exterior of photoreceptor 20, it will be understood that in the case where photoreceptor is transparent or partially transparent, imaging beam 16 and if desired imaging beam 15 may be disposed to impinge against the interior of photoreceptor 20.

OPERATION OF THE FIG. 1 EMBODIMENT

In operation and referring to FIGS. 1 and 2, the moving photoreceptor 20 has a high voltage negative charge placed thereon by corotron 30 at charging station 31 as particularly shown in FIG. 2a. Rotating polygon 61 sweeps the imaging beams 15, 16, following modulation thereof by modulators 55, 56 respectively in accordance with image signals input through image signal lines 58, 59, across the charged photoreceptor at exposure points 33, 34 respectively. Imaging beam 15 which first impinges on photoreceptor 20, exposes the photoreceptor 20 line by line to create a first color latent electrostatic image thereon in accordance with the content of the image signals in line 58 as shown in FIG. 2b. The first color electrostatic image is thereafter developed by developer 36 to provide a first color image as shown in FIG. 2c.

Figure 2D:
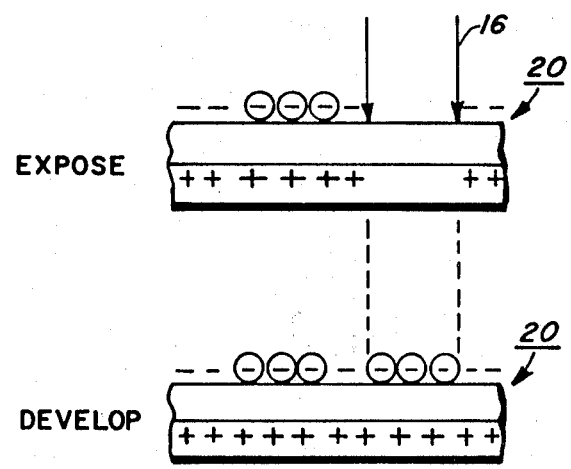
Figure 2E:
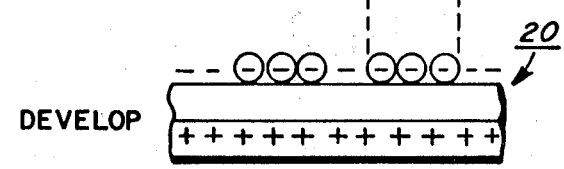
Figure 2F:
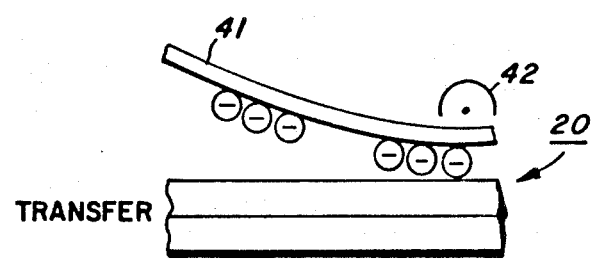

Referring to FIG. 2d, as photoreceptor 20, carrying the first color image, moves past imaging point 34 of the second imaging beam 16, a second color latent electrostatic image is created on photoreceptor 20 line by line by beam 16 in accordance with the image signals input through line 59 to modulator 56 thereof. To assure image registration, the imaging signals input to modulator 56 are delayed for a predetermined interval by buffer 76. The second color latent electrostatic image created by imaging beam 16 is thereafter developed by developer 37 to form a second color image on photoreceptor 20 in registered relation to the first color image as shown in FIG. 2e. The dual color image is thereafter transferred at transfer station 40 to copy substrate material 41 as shown in FIG. 2f. Photoreceptor 20 is then cleaned of residual developing material and any charges remaining thereon by cleaning brush 46 and exposure lamp 47 respectively in preparation for recharging by corotron 30.

Where the first or upstream color toner is not transparent to the second imaging beam 16, exposure of previously developed image areas on photoreceptor 20 does not occur and accordingly overlapping of the second color toner on the first color does not ordinarily occur. Where however the first color toner is transparent to the second imaging beam 16 or where the photoreceptor is transparent or partially transparent to the second beam and the second beam is at least disposed to scan against the interior of the photoreceptor, previously developed image areas are exposed and on subsequent development of the image by developer 37, the second color toner is attracted not only to the previously undeveloped portions of photoreceptor 20 but also to the previously developed portions as well.

DESCRIPTION OF THE FIG. 3 EMBODIMENT

Figure 3:
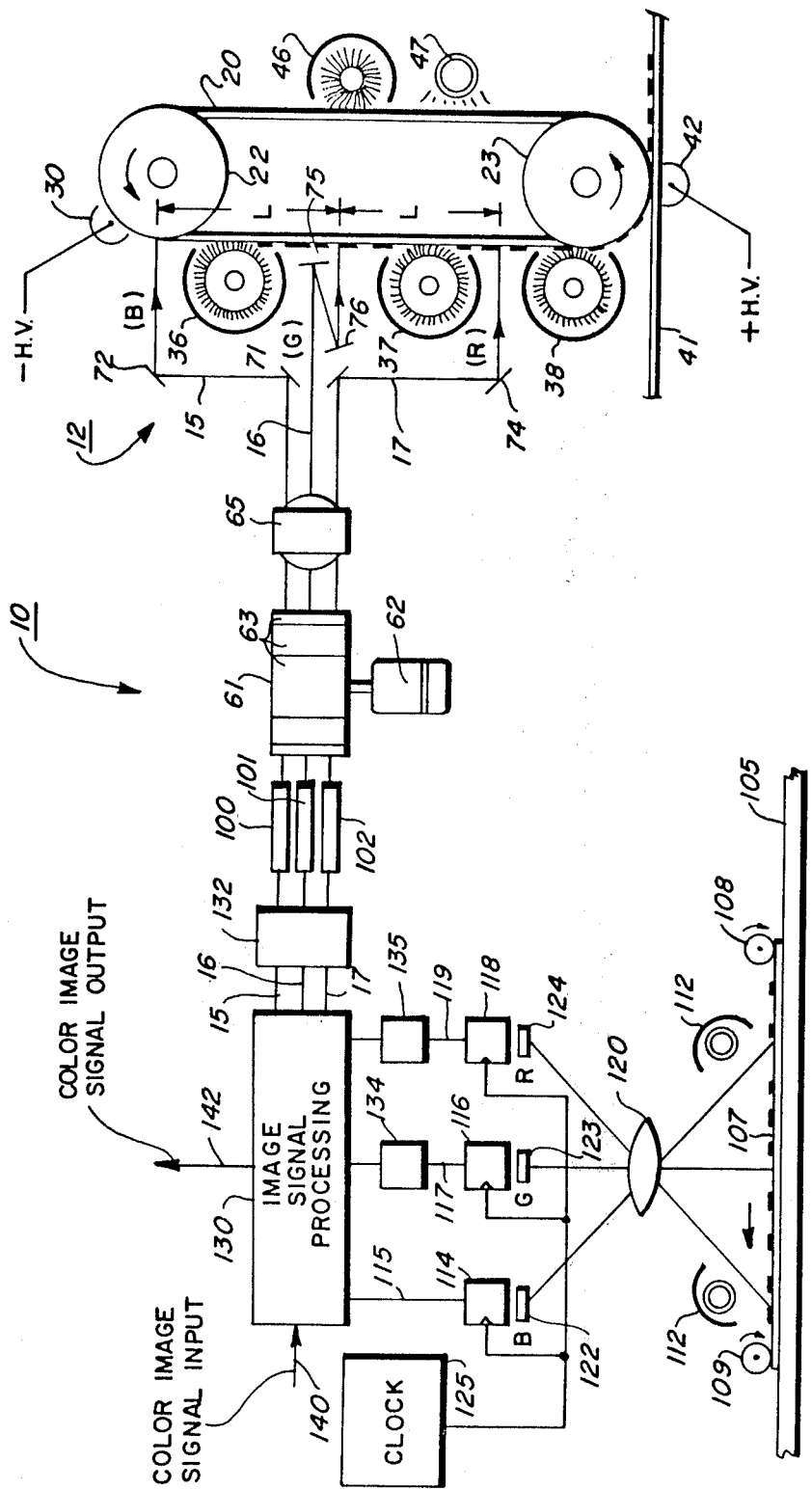
FIG. 3 is a schematic view of an alternate multi-color printer construction combined with a scanner for electronically scanning colored originals.

In the embodiment shown in FIG. 3 where like numbers refer to like parts, the color printer 10' thereshown incorporates, in addition to xerographic processing section 12 and image scanning section 14, a document scanning or reading section 13. In this embodiment, color printer 10' provides full color copies and in this process, blue, green, and red color separation images are produced. Imaging beams 15, 16 serve to provide blue and green color separation image on photoreceptor 20 while an additional imaging beam 17 serves to provide the red color separation image. As will be understood by those skilled in the art, developing of the respective color separation images with yellow, magenta, and cyan toners is required. Accordingly, the first color developer 36 provides yellow toner, the second developer 37 provides magenta toner, and an additional third color developer 38 provides cyan toner. The added developer 38 is preferably constructed the same as that of developers 36, 37 described earlier.

The yellow, magenta, and cyan toners used in this embodiment are preferably formed from dyes that are transparent to image radiation, i.e. infrared (I.R.) radiation as will appear.

The source of imaging beams 15, 16, 17 in this embodiment comprises individual self modulated I.R. diode lasers 100, 101, 102. The imaging beams 15, 16, 17 output by lasers 100, 101, 102 respectively, are swept across photoreceptor 20 by polygon 61 in the manner described heretofore, the facets 63 of polygon 61 and beam focusing lens 65 being enlarged to accommodate the added or third imaging beam 17. Mirror pairs 71, 72, 73, 74 are used to impinge the blue and red imaging beams 15, 17 onto photoreceptor 20 in the manner described heretofore but at a spacing equal to twice L. An additional mirror pair 75, 76 is provided to route the green imaging beam 16 so that beam 16 impinges on photoreceptor 20 at a point midway between beams 15, 17.

Document scanning section 15 has a platen surface 105 for supporting the document 107 to be scanned. In the exemplary arrangement shown, document feed rolls 108, 109 serve to move the document 107 across platen 105 for scanning purposes. Suitable document illuminating means as for example lamps 110, 111 are provided to illuminate the document lines being scanned. Reflectors 112 cooperate with lamps 110 to concentrate the light on document 107.

Linear image sensor arrays 114, 116, 118 which may for example comprise a CCD type array are provided for scanning document 107 line by line, arrays 114, 116, 118 being focused onto document 107 by suitable lens means 120. To provide the requisite color image signals, suitable blue, green and red color separation filters 122, 123, 124, respectively, are interposed in the optical scan path of arrays 114, 116, 118. A suitable clock, 125 is provided for operating arrays 114, 116, 118.

The blue, green and red image signals output by arrays 114, 116 respectively are input through lines 115, 117, 119 to a suitable image signal processor 130 where the image signals are processed, i.e. amplified, to provide blue, green and red control signals to a controller 132 for lasers 100, 101, 102. As will be understood by those skilled in the art, controller 132 serves to control the intensity of the imaging beams output by diode lasers 100, 101, 102 in response to the blue, green and red image signals from arrays 114, 116, 118 respectively.

To accommodate the spatial relationship between imaging beams 15, 16, 17 and assure registration of the color separation images with one another, suitable buffers 134, 135, may be provided for example in lines 117, 119 for the green and red image signals to synchronize input of green and red image signals to image signal processor 130 with each other and with the blue image signal in line 115. In the example shown, buffers 134, 135 delay the green and red image signals by an interval necessary to accommodate the interval between the time the image signals are produced by arrays 114, 116 and the time the images corresponding thereto are imaged onto photoreceptor 20 by beams 16, 17.

Where desired, color image signals derived from a source other than arrays 114, 116, 118, i.e. a memory, data communication channel etc., may be fed to image signal processor 130 through image signal input bus 140 provided for that purpose. Similarly, color image signals derived from arrays 114, 116, 118 may be output to other users such as a memory, data communication channel, etc. through image signal output bus 142.

OPERATION OF THE FIG. 3 EMBODIMENT

In operation of the multi-colored printer 10' of FIG. 3, color image signals (i.e. blue, green, red) are derived from document 107 through scanning thereof by arrays 114, 116, 118, of the document scanning section 15, the image signals being processed by image signal processor 130. From processor 130, the image signals are input to controller 132 which regulates the intensity of the imaging beams 15, 16, 17 in accordance therewith. The imaging beams 15, 16, 17 successively scan across the moving previously charged photoreceptor, scanning motion being imparted to beams 15, 16, 17 by the rotating polygon 61 to create in succession blue, green, and red color separation images. The color separation images are developed in succession by yellow, magenta, and cyan developers 36, 37, 38 respectively to form a composite color image which is thereafter transferred to copy substrate material 41 and fused by a suitable fuser (not shown) to provide a color copy of the original document 107.

It will be understood that the transparency of the color toners to electromagnetic radiation, as for example the I.R. radiation output by diode lasers 100, 101, 102, permits subsequent imaging beams to expose photoreceptor 20 through previously developed images as described heretofore to provide a composite color copy of the original document 107. Alternately, a transparent or partially transparent photoreceptor may be used with imaging beams 16, 17 (and beam 15 if desired) disposed to impinge on the photoreceptor interior. In that circumstance, toner transparent to image radiation is not required.

While exact resistration of the color separation images with one another has been described, it is understood that by adjusting the timing of the color image signals, a slight misregistration or offset between the color separation images may be achieved. For example, by adjusting buffers 134, 135, timing of the input of the red image signals may be advanced slightly while that of the green image signals may be retarded slightly relative to the timing required for exact image registration. As a result, in instances where a composite color formed by the intermixture of two or more color toners is to be effected, the color toners tend to be deposited in a side by side relation rather than in a vertical relation. In that instance, subsequent fusing of the image is relied upon to intermix the color toners to produce the color desired.

Other timing relationships between the color image signals may of course be contemplated.

While the invention has been described with reference to the structure disclosed, it is not confined to the details set forth, but is intended to cover such modifications or changes as may come within the scope of the following claims.

I claim:

1. A system for producing color copies comprising:
   (a) a movable photoreceptor;
   (b) means to uniformly charge said photoreceptor in preparation for imaging;
   (c) a beam of high intensity radiation impinging on said photoreceptor at a point downstream of said charge means;
   (d) means for scanning said beam across said photoreceptor;
   (e) modulating means to modulate said beam in accordance with color image signals as said beam is scanned across said photoreceptor whereby to selectively reduce the charge on said photoreceptor and create a first color latent electrostatic image on said photoreceptor;
   (f) first color developing means for developing said first color image;
   (g) at least one additional beam of high intensity radiation impinging on said photoreceptor at a point downstream of said color developing means;
   (h) means for scanning said additional beam across said photoreceptor;
   (i) second modulating means to modulate said additional beam in accordance with color image signals as said additional beam is scanned across said photoreceptor whereby to selectively reduce the charge on said photoreceptor and create a second color latent electrostatic image on said photoreceptor;
   (j) second color developing means for developing said second color image; and
   (k) means for transferring said combined first and second color images to a copy substrate material to produce color copies.

2. The system according to claim 1 in which said additional beam impinges on said photoreceptor at a predetermined distance from the point where said first mentioned beam impinges on said photoreceptor, and image signal control means for delaying input of the color image signals to said second modulating means to register said second color image with said first color image.

3. The system according to claims 1 or 2 in which said first and second color developing means have first and second color developers respectively, said first color developer being transparent to said additional beam.

4. The system according to claims 1 or 2 in which said photoreceptor is transparent to at least said additional beam, said additional beam being disposed to impinge on said photoreceptor at a side of said photoreceptor opposite the side on which said color images are developed by said first and second color developing means.

5. The system according to claim 1 in which said first and second color developing means have first and second color developers respectively, said second color developer being darker than said first color developer to reduce the possibility of visibly degrading said second color image with said first color image.

6. The system according to claim 1 including image reading means for scanning a colored original to provide said color image signals.

7. In a multi-color reproduction apparatus, the combination of:
   (a) a movable photoreceptor;
   (b) means to charge said photoreceptor in preparation for imaging;
   (c) first and second beams of high intensity radiation;
   (d) beam directing means to impinge said beams on said photoreceptor at predetermined spaced points, said first beam impinging on said photoreceptor upstream of said second beam;
   (e) beam scanning means for scanning said beams across said photoreceptor;
   (f) first modulator means for modulating said first beam in accordance with first color image signals whereby said first beam selectively discharges said photoreceptor to provide a first color latent electrostatic image on said photoreceptor;
   (g) first developer means for developing said first color latent electrostatic image with a first color developer, said first developer means being disposed between the points where said first and second beams impinge on said photoreceptor whereby to develop said first color image before said photoreceptor is scanned by said second beam;
   (h) second modulator means for modulating said second beam in accordance with second color image signals whereby said second beam selectively discharges said photoreceptor to provide a second color latent electrostatic image on said photoreceptor;
   (i) image signal controlling means for synchronizing input of said second color image signals with input of said first color image signals to register said second color latent electrostatic image with said first color latent electrostatic image; and
   (j) second developer means for developing said second color latent electrostatic image with a second color developer whereby to provide a multi-color image.

8. The apparatus according to claim 7 in which said first color developer is transparent to said second beam whereby said second beam exposes said photoreceptor through said first color developer.

9. The apparatus according to claim 7 in which said first color developer is substantially opaque to said second beam so that said first color developer inhibits exposure of said photoreceptor by said second beam in areas of said photoreceptor where said first color developer is present.

10. The apparatus according to claim 7 in which said image signal controlling means times input of said second color image signals so that said first and second color images are slightly offset from one another.

11. The apparatus according to claim 7 including raster scanning means for scanning a color image to provide said first and second color image signals.

12. The apparatus according to claim 7 including
a third beam of high intensity radiation, said beam directing means impinging said third beam on said photoreceptor downstream of said second color developer means, said beam scanning means scanning said third beam across said photoreceptor in unison with said first and second beams;
third modulator means for modulating said third beam in accordance with third color image signals whereby said third beam selectively discharges said photoreceptor to provide a third color latent electrostatic image on said photoreceptor, said image signal controlling means synchronizing input of said third color image signals with input of said first and second color image signals to register said third color latent electrostatic image with said first and second color latent electrostatic images; and
third developer means for developing said third color latent electrostatic image with a third color developer whereby to provide a multi-color image.

13. The apparatus according to claim 12 in which said first and second color developers are transparent to said second and third beams respectively whereby to enable said second and third beams to expose said photoreceptor through said first and second color developers respectively.

14. The apparatus according to claim 12 in which said image signal controlling means times input of said second and third color image signals so that said second and third color images are slightly offset from one another and from said first color image.

15. The apparatus according to claim 12 including raster scanning means for scanning a color original to provide said first, second and third color image signals.

16. In the method of producing color images, the steps which comprise:
(a) scanning a first writing beam modulated in accordance with first color image signals across a charged photoreceptor;
(b) developing areas discharged by said first beam with a first color toner to form a first color image on said photoreceptor;
(c) scanning at least a second writing beam modulated in accordance with second color image signals across the same area of said photoreceptor as scanned by said first beam; and
(d) developing areas discharged by said second beam with a second color toner to form a second color image on said photoreceptor in registered relation with said first color image.

17. The method according to claim 16 including the step of developing said first color image with first color toner that is transparent to said second beam so that on subsequent scanning of said photoreceptor by said second beam, areas of said photoreceptor covered by said first color toner may be discharged in accordance with said second color image signals.

18. The method according to claim 16 including the steps of:
using a photoreceptor that is at least partially transparent to said second beam; and
impinging said second beam on the side of said transparent photoreceptor opposite the side on which color images are developed whereby to selectively discharge the same area of said photoreceptor as scanned by said first beam including areas of said photoreceptor covered by said first color developer without requiring said first color developer to be transparent to said second beam.

19. The method according to claim 16 in which said first and second color images comprise color separation images, and including the steps of
scanning a third writing beam modulated in accordance with third color separation image signals across the same area of said photoreceptor as scanned by said first and second beams; and
developing areas discharged by said third beam with a third color toner to form a third color separation image on said photoreceptor in registered relation with said first and second color separation images.

* * * * *